US011716669B2

(12) United States Patent
Zhang

(10) Patent No.: US 11,716,669 B2
(45) Date of Patent: Aug. 1, 2023

(54) INTERNET OF THINGS SERVICE ROUTING METHOD

(71) Applicant: Huawei Cloud Computing Technologies Co., Ltd., Guizhou (CN)

(72) Inventor: Yongjing Zhang, Nanjing (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 133 days.

(21) Appl. No.: 17/126,772

(22) Filed: Dec. 18, 2020

(65) Prior Publication Data

US 2021/0136653 A1 May 6, 2021

Related U.S. Application Data

(63) Continuation of application No. PCT/CN2019/091448, filed on Jun. 16, 2019.

(30) Foreign Application Priority Data

Jun. 20, 2018 (CN) .......................... 201810637157.3

(51) Int. Cl.
*H04W 40/02* (2009.01)
*H04W 40/24* (2009.01)
(Continued)

(52) U.S. Cl.
CPC ........... *H04W 40/02* (2013.01); *H04W 12/08* (2013.01); *H04W 36/22* (2013.01); *H04W 40/24* (2013.01)

(58) Field of Classification Search
CPC ..... H04W 40/02; H04W 12/08; H04W 36/22; H04W 40/24; H04W 28/0268;
(Continued)

(56) References Cited

U.S. PATENT DOCUMENTS

2018/0206152 A1 7/2018 Zhang et al.
2018/0310169 A1 10/2018 Wang
(Continued)

FOREIGN PATENT DOCUMENTS

CN 103650437 A 3/2014
CN 106550410 A 3/2017
(Continued)

OTHER PUBLICATIONS

Huawei "Network Slice instance selection," SA WG2 Meeting #122, S2-175045, Jun. 30, 2017, 21 pages.
(Continued)

*Primary Examiner* — Ashley Shivers
(74) *Attorney, Agent, or Firm* — Huawei Technologies Co., Ltd.

(57) ABSTRACT

In an Internet of things (IoT) service routing method, a mapping relationship between a service feature and a network slice is established on an IoT platform, or a routing policy for determining a network slice based on a service feature is established on an IoT platform, so that the IoT platform can select, based on a service feature of a service message sent by an industry application, an appropriate network slice to send a service message to a terminal device, to meet a plurality of network requirements of the industry application.

12 Claims, 9 Drawing Sheets

(51) Int. Cl.
*H04W 12/08* (2021.01)
*H04W 36/22* (2009.01)

(58) Field of Classification Search
CPC . H04W 48/18; H04W 28/08; H04W 36/0011; H04L 47/78
See application file for complete search history.

(56) References Cited

U.S. PATENT DOCUMENTS

| | | | |
|---|---|---|---|
| 2019/0037636 A1 | 1/2019 | Kim et al. | |
| 2019/0140904 A1 | 5/2019 | Huang et al. | |
| 2019/0174321 A1 | 6/2019 | Sun et al. | |
| 2019/0230584 A1 | 7/2019 | Lou et al. | |
| 2019/0324737 A1* | 10/2019 | Patil | G06F 8/65 |
| 2020/0059521 A1* | 2/2020 | Sciancalepore | H04L 47/70 |
| 2020/0112492 A1* | 4/2020 | Chatras | H04W 48/18 |
| 2021/0144619 A1* | 5/2021 | Prakash | H04W 48/00 |

FOREIGN PATENT DOCUMENTS

| | | |
|---|---|---|
| CN | 106572516 A | 4/2017 |
| CN | 106657194 A | 5/2017 |
| CN | 106937362 A | 7/2017 |
| CN | 107040481 A | 8/2017 |
| CN | 107277883 A | 10/2017 |
| CN | 107295609 A | 10/2017 |
| CN | 107580360 A | 1/2018 |
| CN | 107659419 A | 2/2018 |
| CN | 107809776 A | 3/2018 |
| CN | 107872345 A | 4/2018 |
| EP | 3419351 A1 | 12/2018 |
| EP | 3509355 A1 | 7/2019 |
| WO | 2017076086 A1 | 5/2017 |
| WO | 2017114327 A1 | 7/2017 |
| WO | 2017133535 A1 | 8/2017 |
| WO | 2017140204 A1 | 8/2017 |
| WO | 2017140340 A1 | 8/2017 |
| WO | 2017142362 A1 | 8/2017 |
| WO | 2018045983 A1 | 3/2018 |
| WO | 2018049646 A1 | 3/2018 |

OTHER PUBLICATIONS

"5G Network Architecture—A High-Level Perspective," 2016, 10 pages.

3GPP TS 23.501 V15.2.0, "3rd Generation Partnership Project; Technical Specification Group Services and System Aspects; System Architecture for the 5G System; Stage 2 (Release 15)," Jun. 2018, 216 pages.

3GPP TS 23.503 V15.2.0, "3rd Generation Partnership Project; Technical Specification Group Services and System Aspects; Policy and Charging Control Framework for the 5G System; Stage 2 (Release 15)," Jun. 2018, 67 pages.

"Functional Architecture," oneM2M Technical Specification, TS-0001-V2.10.0, Aug. 2016, 427 pages.

Nokia, et al., "Solutions for for Network Slice Selection," 3GPP TSG-RAN WG3 Meeting #92 R3-161356, Nanjing, China, May 23-27, 2016, 6 pages.

Drafting group (ed: Patrice Hede, Huawei), "Network Slice instance selection," SA WG2 Meeting #122 draft—S2-174991, Jun. 26-30, 2017, Cabo, Mexico, 23 pages.

Zhao, Q., "Talking about 5G mobile network slicing technology and key issues research," Network Security Technology and Application, Dec. 2017, with an English abstract, 4 pages.

Xin, S., et al., "A Network Slice Management Scheme Based on Network Functions Virtualisation," Science Technology and Engineering, vol. 17, No. 29, Oct. 2017, with an English abstract, 7 pages.

* cited by examiner

INTERNET OF THINGS SERVICE ROUTING METHOD

CROSS-REFERENCE TO RELATED APPLICATIONS

This is a continuation of Int'l Patent App. No. PCT/CN2019/091448, filed on Jun. 16, 2019, which claims priority to Chinese Patent App. No. 201810637157.3, filed on Jun. 20, 2018, which are incorporated by reference.

FIELD

This disclosure relates to the communications field, and in particular, to an Internet of things (IoT) service routing method, apparatus, and system.

BACKGROUND

In a next-generation mobile communications network architecture (namely, a fifth-generation (5G) network architecture) formulated by the 3rd Generation Partnership Project (3GPP) standard organization, a physical network may be abstracted into a plurality of network slices, each network slice forms an end-to-end logical network, and the network slices are logically isolated from each other. Each slice may flexibly provide one or more network services according to a requirement of a demander, and does not affect another slice in the network.

To support various services of customers, for example, an enhanced mobile broadband (eMBB) service represented by high-definition video and virtual reality, an ultra-reliable and low-latency communications (uRLLC) service represented by autonomous driving and industrial manufacturing, and a massive machine type communications (mMTC) service represented by intelligent meter reading, an operator creates one or more network slices for each type of service.

In the IoT era, a single industry application usually needs to use a plurality of network slices, and it is difficult for a single network slice to meet different service requirements. For example, in an Internet of vehicles (IoV) service, a uRLLC slice is required to meet an ultra-reliable and low-latency communications requirement during autonomous driving, and an eMBB slice is also required to meet a high-bandwidth communication requirement of in-vehicle infotainment and the like. Similarly, in the fields such as energy and smart city, an mMTC slice is required to support massive meter reading services, and a uRLLC slice is also required to support real-time and reliable pipeline network line monitoring to avoid disasters.

Further, in a typical deployment of an IoT system, a plurality of industry applications may manage a terminal device or access service data related to the terminal device through a unified IoT platform (or simply platform), and the platform and the terminal device are connected through one or more network slices of the operator. Therefore, there is also a requirement that a single platform uses a plurality of network slices at the same time.

Although the 5G network architecture defined by 3GPP allows one terminal device to access and use a plurality of network slices at the same time, there is a limitation that different application identifiers need to be used when the terminal device accesses different network slices. In other words, a service message related to an application can be transmitted through only one network slice, and a requirement that a single industry application uses a plurality of network slices for communication cannot be met. In addition, other approaches do not resolve a problem of how an industry application or an IoT platform selects an appropriate network slice to perform downlink communication with a terminal device.

SUMMARY

An embodiment provides an IoT service routing method. A mapping relationship between a service feature and a network slice is established on an IoT platform, or a routing policy for determining a network slice based on a service feature is established on an IoT platform, so that the IoT platform can select, based on a service feature of a service message sent by an industry application, an appropriate network slice to communicate with a terminal device, to meet a plurality of network requirements of the industry application.

The IoT platform may obtain information (including a slice identifier and/or a slice network element address) about a network slice and a slice-related service feature from an industry application, UE, or an underlying network. For example, when a provider of the industry application or an operator directly signs a contract with a network operator in advance to purchase a network slice service, the network slice information and the slice-related service feature are configured on the industry application or the terminal device in advance, and then are sent to a platform through a registration message or a configuration message of the industry application or the terminal device. Alternatively, when a provider of the industry application or an operator does not sign a contract with a network operator in advance to purchase a network slice service, the IoT platform may first obtain a service level agreement and a service feature description from the industry application, then purchase a network slice service from an operator of the underlying network according to the service level agreement, create a network slice, and obtain information about the network slice. In this manner, that the mapping relationship between the network slice and the service feature is established on the IoT platform is equivalent to that a service routing policy for determining the network slice based on the service feature is established. The service routing policy specifies a network slice from which service messages with different features should be delivered to the terminal device, to ensure a service level agreement of transmitting different service messages between the industry application and the terminal device.

When receiving a service message sent by the industry application to the terminal device, the IoT platform parses a service feature in the service message, and matches the service feature with a stored service routing policy, to select a network slice corresponding to the service feature to send the service message to the terminal device.

Optionally, the IoT platform may further establish a service routing policy for the terminal device, and deliver the service routing policy to the terminal device. The terminal device stores the received service routing policy, and when sending a service message, selects, based on a service feature of the service message, a corresponding network slice to send the service message. The IoT platform may deliver the service routing policy to the terminal device in a plurality of implementations, for example, deliver the service routing policy through a service registration response message of the terminal device, a device management command, a dedicated service configuration message, a network capability exposure API, or an embedded subscriber identity module (eSIM).

Optionally, the slice-related service feature may include a service feature of a service flow that is allowed to pass or forbidden to pass a specific slice, to manage a network slice resource and traffic, avoid abuse of the network slice resource by an unnecessary (for example, unauthorized, irrelevant, or malicious) service flow, and enable the IoT platform to filter and control service flows of a specific network slice.

The IoT service routing method relates to apparatuses such as an IoT platform, an industry application server, and a terminal device. Therefore, this disclosure further provides an apparatus to implement the foregoing IoT service routing method.

In addition, this disclosure further provides a computer-readable storage medium. The computer-readable storage medium stores an instruction, and when the instruction is run on a computer, the computer is enabled to perform the foregoing IoT service routing method.

Finally, this disclosure provides a computer program product including an instruction. When the computer program product is run on a computer, the computer is enabled to perform the foregoing IoT service routing method.

DETAILED DESCRIPTION

Figure 1:
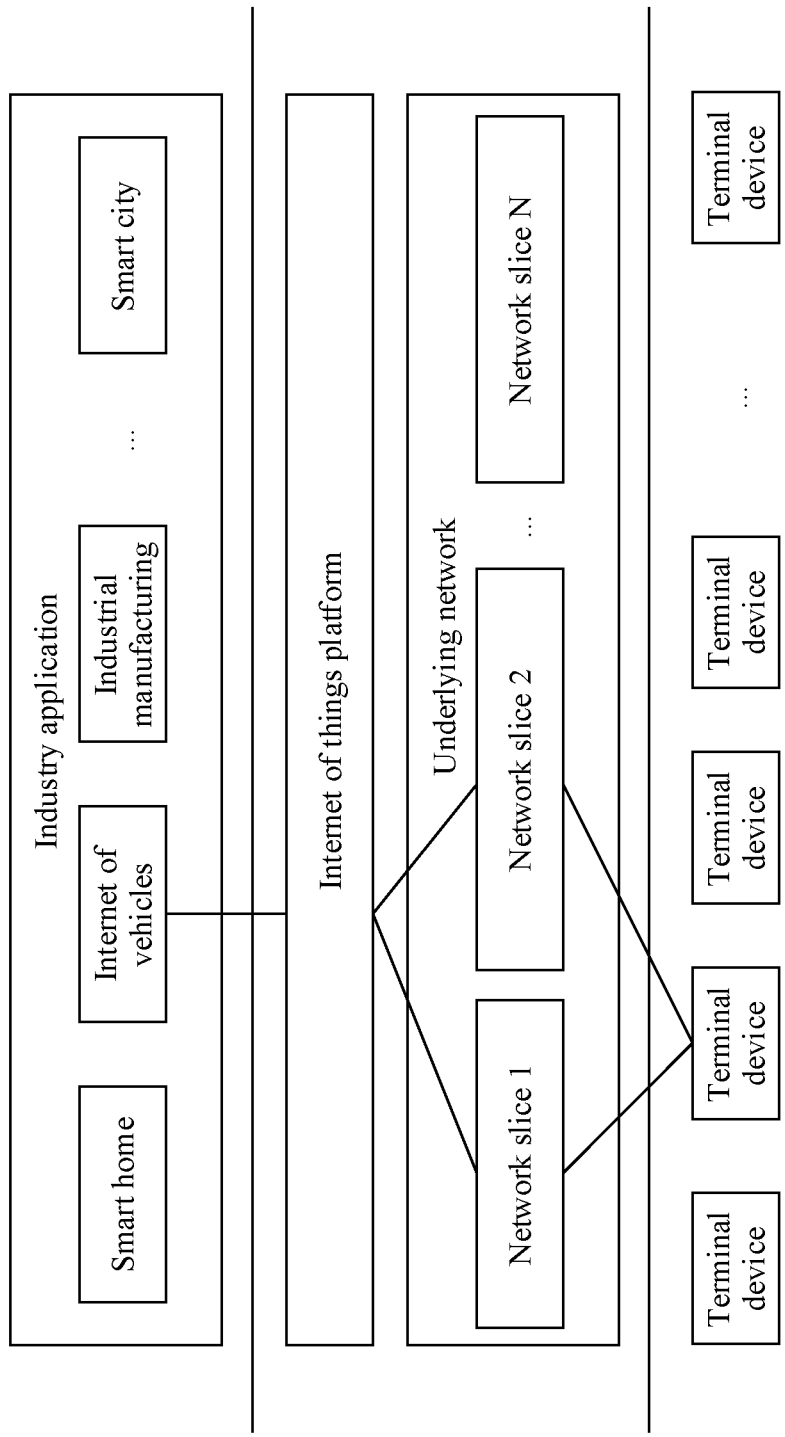
FIG. 1 shows an IoT system architecture.

FIG. 1 shows an IoT system architecture according to an embodiment. The system architecture includes industry applications (applications that provide services for specific industries, or applications that provide services in specific scenarios or environments, such as smart home, IoV, industrial manufacturing, and smart city), an IoT platform, an underlying network, and terminal devices. The industry applications communicate with the terminal devices through the platform, and the platform is connected to and communicates with the terminal devices through the underlying network. The terminal devices may access the underlying network in a plurality of connection modes (for example, wired or wireless access) and access protocols (for example, Wi-Fi, ZigBee, Bluetooth, a narrowband IoT (NB-IoT), and 5G). This is not limited in this embodiment. The underlying network refers to a transport network at a lower layer of a protocol stack, relative to an application layer at which the industry applications are located. Any network that can implement communication between the platform and the terminal devices may be referred to as an underlying network. The underlying network may be divided into a plurality of network slices (or virtual networks). Each network slice is divided based on network requirements (such as, a latency, bandwidth, security, and reliability). In different service scenarios, the platform and the terminal devices communicate through network slices that meet the network requirements.

Figure 2:
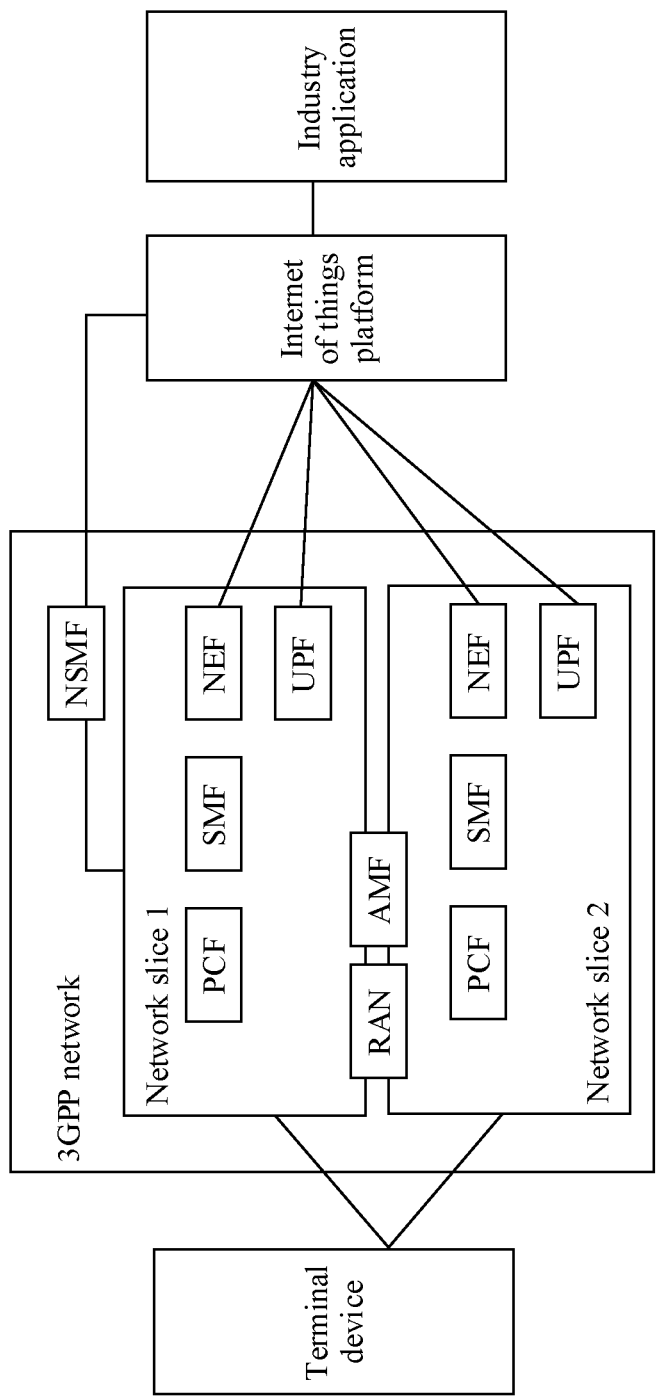
FIG. 2 shows a 3GPP network-based IoT system architecture.

When the underlying network in this embodiment is a 5G network defined by 3GPP, the system architecture shown in FIG. 1 may be further refined to a system architecture shown in FIG. 2. A 3GPP network provides network slices and network slice-based communication services, for example, communication performed through a user plane function (UPF) and communication performed through a network exposure function (NEF). The 3GPP network further provides a network slice management function, for example, a network slice is created and information is queried through the network slice management function (NSMF). The 3GPP network further includes network elements defined in a 3GPP standard, such as a radio access network (RAN), an access management function (AMF), and a policy control function (PCF). Details are not described herein. According to a network deployment requirement, there may be zero, one or more instances for the network elements in one network slice.

Figure 3:
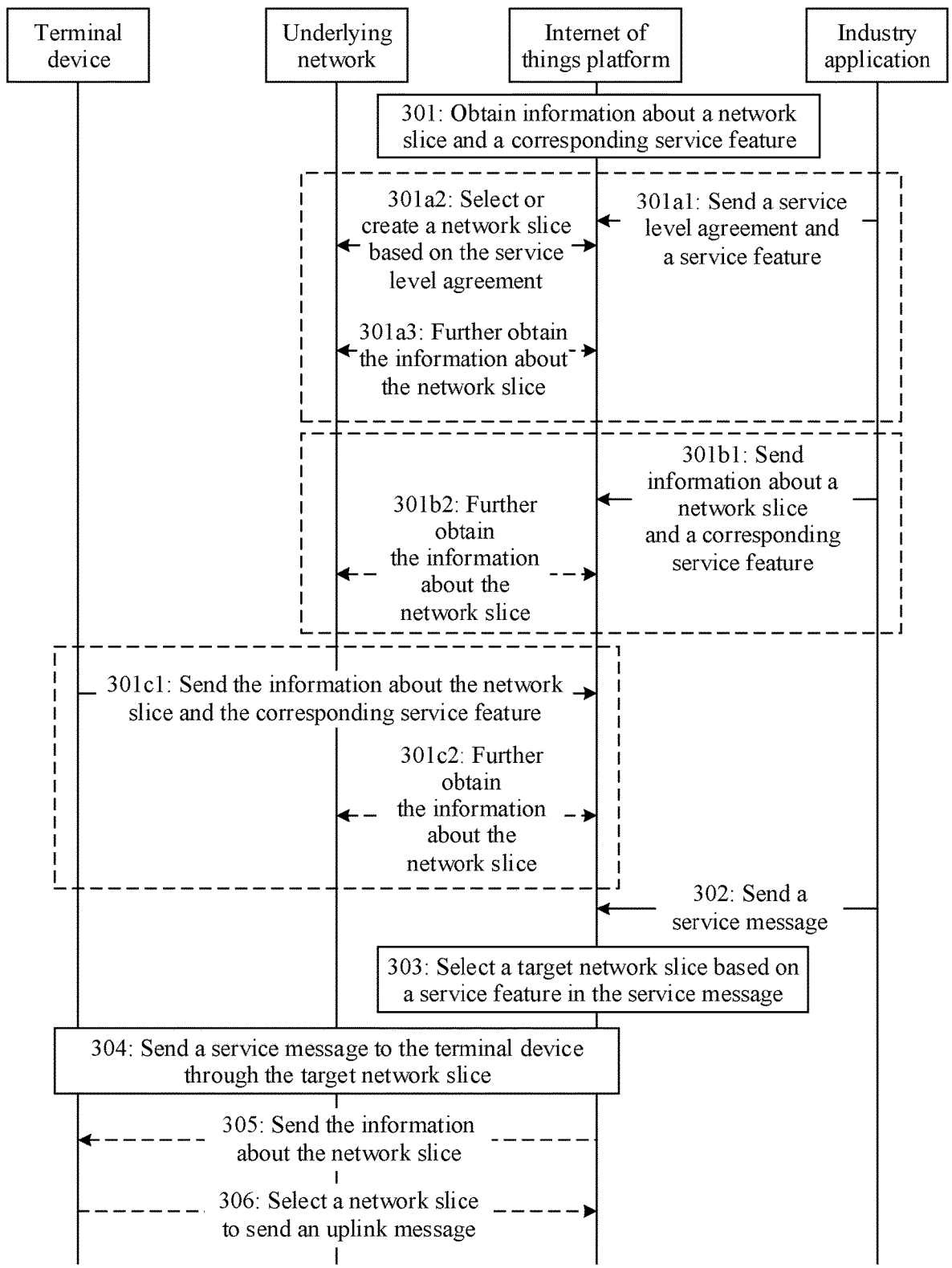
FIG. 3 is a schematic flowchart of an IoT service routing method according to an embodiment.

Based on the system architectures shown in FIG. 1 and FIG. 2, FIG. 3 is used as an example to briefly describe a method provided in an embodiment, so that a reader has a preliminary understanding of the method in this embodiment.

301: A platform obtains information about a network slice and a service feature corresponding to the network slice. It should be noted that in different service scenarios, the platform may obtain, in different manners, the information about the network slice and the service feature corresponding to the network slice.

Service scenario a: A provider of an industry application or an operator manages the network slice through the platform. In this service scenario, the provider of the industry application provider or the operator does not directly purchase a network slice service from an operator of an underlying network, the industry application sends a service-level agreement (SLA) to the platform, and the platform purchases a network slice service from the operator of the underlying network and creates a network slice based on an SLA requirement of the industry application, so that the industry application and a terminal device can communicate with each other through a network slice matching the SLA. Details are as follows:

301a1: The industry application sends a required SLA and a required service feature to the platform. The SLA may be understood as quality of service (QoS) and service capability requirements that are required by the industry application and that are required for transmission of a service flow that meets one or more features, and the requirements include but are not limited to parameters of one or more of the following: bandwidth, latency, jitter, reliability, isolation, mobility, hibernation period, buffer size, location area, roaming capability, whether synchronization is performed, and the like. During a specific implementation, the SLA may be sent to the platform in a form of a list of the foregoing parameters, or several configuration options (Profile) that are based on the list of the foregoing parameters may be preset on the platform and selected by the industry application (for example, sending an identifier or a type of a configuration option). The service feature includes but is not limited to one or more of the following features: a source/destination application identifier, a source/destination middleware identifier, a resource identifier or type, a message type (request/response) or an operation method (for example, common C/R/U/D/N operations in RESTful API invoking, and operations indicating creation, obtaining, update, deletion, notification, or the like), a message priority, and the like.

301a2: The platform selects an existing network slice or creates a new network slice for the industry application based on the SLA. For example, when a network slice that can meet the SLA exists in one or more existing network slices connected to the platform, the platform may select the network slice that meets the SLA to serve the industry application. If no network slice that meets the SLA (for example, a latency or bandwidth requirement is not met), the platform needs to interact with the underlying network, to request the underlying network to create a new network slice that meets a requirement of the SLA (for example, request the NSMF in FIG. 2 to create a network slice). Then, the platform obtains information about the new network slice (for example, obtain the information about the network slice from the NSMF in FIG. 2), and establishes a connection to the new network slice (for example, establish connections to the UPF and the NEF that are in FIG. 2). The connection establishment includes establishment of a related transport network/link layer channel (for example, establishment of a tunnel or a VLAN), a network layer secure connection, and the like. When the description of the SLA is inconsistent with an input parameter (namely, a slice template) required by the underlying network to create a network slice, the platform further needs to first map the description of the SLA into a slice template, and request the underlying network to create the new network slice. It should be noted that the information about the network slice includes but is not limited to one or more pieces of information, such as a network slice identifier, a network slice name, a network slice type, an operator identifier or name, and a network element address (including an Internet Protocol (IP) address and transport layer information) of the network slice.

Service scenario b: The industry application directly purchases a network slice service from the operator of the underlying network, and information about a purchased network slice and a service feature corresponding to the network slice are configured on the industry application in advance.

301b1: The industry application sends, to the platform, the information about the purchased network slice and the service feature corresponding to the network slice, and the platform establishes a connection to the network slice (for example, establish connections to the UPF and the NEF that are in FIG. 2).

Service scenario c. Similar to the service scenario b, the industry application directly purchases a network slice service from the operator of the underlying network. A difference from the service scenario b is that information about a network slice purchased by the industry application and a service feature corresponding to the network slice are configured on the terminal device in advance.

301c1: The terminal device sends, to the platform, the information about the network slice purchased by the industry application and the service feature corresponding to the network slice, and the platform establishes a connection to the network slice (for example, establish connections to the UPF and the NEF that are in FIG. 2).

It should be noted that after obtaining the information about the network slice in the step 301a2, 301b1, or 301c1, the platform may further select, based on whether the information about the network slice is complete, to further obtain supplementary information about the network slice from the underlying network, as shown in steps 301a3, 301b2, and 301c2 in the figure. For example, in the step 301a2, 301b1, or 301c1, only a name or an identifier of the network slice is provided, but a necessary network element address and related transport layer information (for example, a tunnel identifier and a VLAN-ID) in the network slice are not provided. Alternatively, when only some network element address information (for example, a UPF address) is provided, but the other network element address information (for example, an NEF address) is not provided, the platform may initiate a network slice information query request (for example, query the NSMF in FIG. 2) to the underlying network, to obtain required network element address information and related transmission channel information based on the name/identifier/some network element address information of the network slice.

In the step 301, the platform records a correspondence between the network slice and the service feature, as shown in Table 1. In other words, a corresponding network slice and information about the network slice may be determined based on the service feature, or a corresponding service feature may be determined based on the information about the network slice. This is equivalent to establishing a service routing policy for selecting the network slice based on the service feature. The service routing policy may be further refined and include an uplink service routing policy and a downlink service routing policy. The uplink service routing policy may be sent to the terminal device (see step 305), the downlink service routing policy is used by the platform, and the platform selects a network slice based on the downlink service routing policy to send a downlink service message.

TABLE 1

| Routing policy | Information about the network slice | Service features |
|---|---|---|
| 1 | Slice identifier<br>Slice name<br>Operator identifier<br>Operator name<br>Address of a network element 1 of the network slice<br>Address of a network element 2 of the network slice | Source application identifier or type<br>Destination application identifier or type<br>Source middleware identifier or type<br>Destination middleware identifier or type<br>Resource identifier or type<br>Message type<br>Operation method<br>Message priority |

Service routing policy (namely, the correspondence between the network slice and the service feature)

302: The platform receives a downlink service message sent by the industry application to the terminal device.

303: The platform parses the downlink service message, to obtain a service feature in the service message, and determine a network slice, namely, a target network slice corresponding to the service feature.

304: The platform sends a service message to the terminal device through the target network slice.

305: Optionally, in the service scenarios a and b, after obtaining a correspondence between the information about the network slice and the service feature, the platform may further send, to the terminal device, the information about the network slice and the service feature corresponding to the network slice, so that the terminal device establishes an uplink service routing policy, in other words, records the network slice and the service feature corresponding to the network slice. It should be noted that the information about the network slice and the corresponding service feature do not need to be sent to the terminal device at the same time. Alternatively, a message sent by the IoT platform in the step 305 may include only the information about the network slice to be accessed by the terminal device, but does not include information about the service feature, or the service feature corresponding to the information about the network slice is delivered to the terminal device in another message. Subsequently, when sending an uplink service message to the platform and the industry application, the terminal device selects, based on the information about the network slice delivered by the IoT platform, an appropriate network slice to send the uplink service message. A sequence of the step 305 and the steps 302, 303, and 304 is not limited.

It can be learned that according to the solution provided in this embodiment, a same industry application can use different network slices to communicate with the terminal device, and the terminal or the platform can select a network slice based on a service layer parameter (for example, the service feature) and a granularity. This meets a requirement of the industry application or the terminal for flexibly using a network slice based on a message type, an accessed data resource, and the like.

It should be noted that the service feature corresponding to the network slice may be further divided into an allowed service feature and a forbidden service feature (as shown in Table 2), to manage a network slice resource and traffic, avoid abuse of the network slice resource by an unnecessary (for example, unauthorized, irrelevant, or malicious) service flow, and enable the IoT platform to filter and control service flows of a specific network slice. For example, after obtaining the service feature in the step 303, the platform first determines whether the service feature is a forbidden service feature or an allowed service feature. If the service feature is a forbidden service feature, the platform does not send a downlink message through a network slice corresponding to the service feature, in other words, the step 304 is not performed. If the service feature is an allowed service feature, the platform performs the step 304.

TABLE 2

Service routing policy (namely, the correspondence between the network slice and the service feature)

| Routing policy | Information about the network slice | Allowed service features | Forbidden service features |
|---|---|---|---|
| 1 | Slice identifier<br>Slice name<br>Operator identifier<br>Operator name<br>Address of a network element 1 of the network slice<br>Address of a network element 2 of the network slice | Source application identifier or type<br>Destination application identifier or type<br>Source middleware identifier or type<br>Destination middleware identifier or type<br>Resource identifier or type<br>Message type<br>Operation method<br>Message priority | Source application identifier or type<br>Destination application identifier or type<br>Source middleware identifier or type<br>Destination middleware identifier or type<br>Resource identifier or type<br>Message type<br>Operation method<br>Message priority |

The following further describes, based on a general method procedure shown in FIG. 3 and in different service scenarios, the solution provided.

Figure 4A:
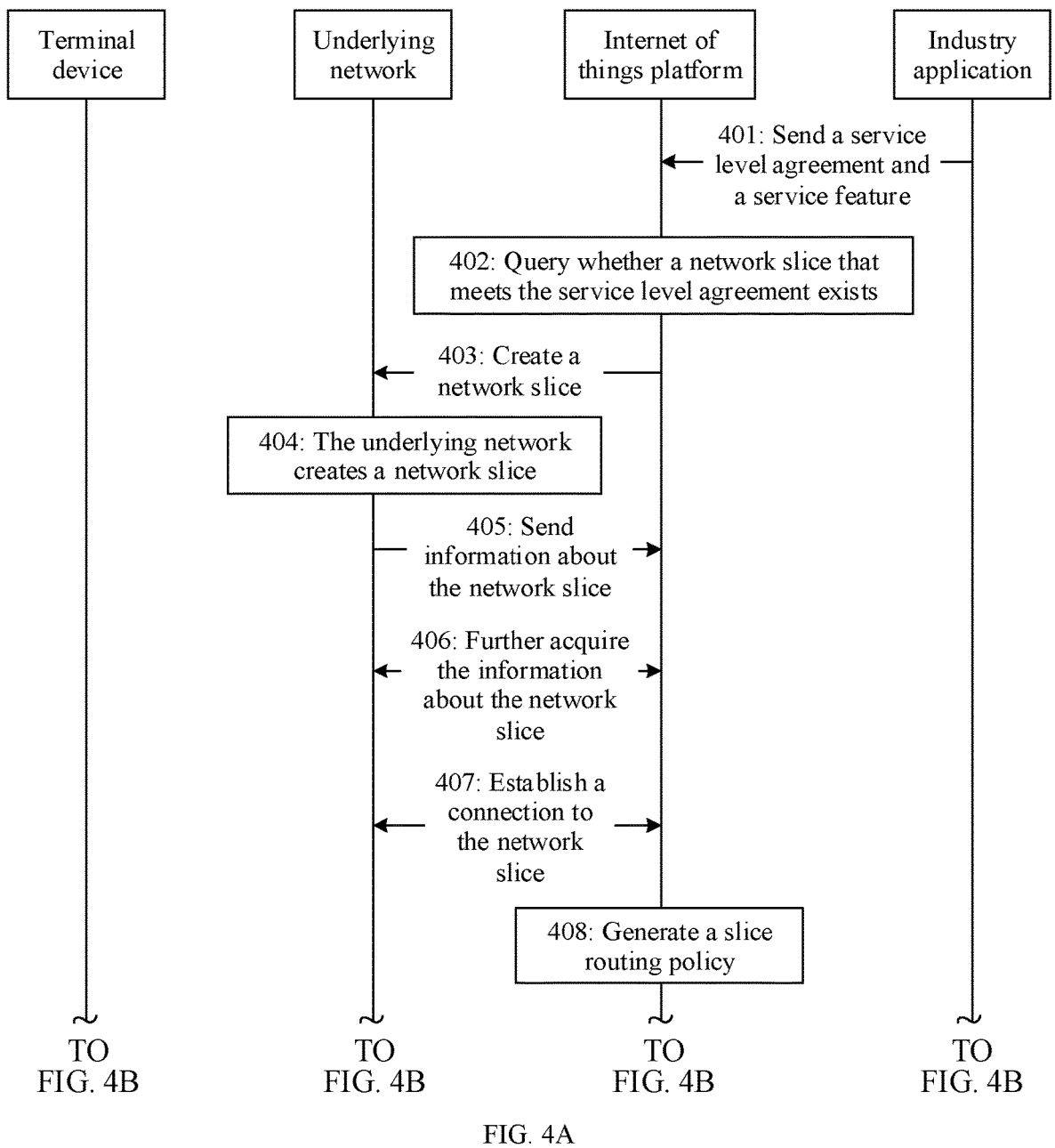
FIG. 4A and FIG. 4B are a flowchart of an IoT service routing method in a scenario in which an industry application manages a network slice through an IoT platform according to an embodiment.
Figure 4B:
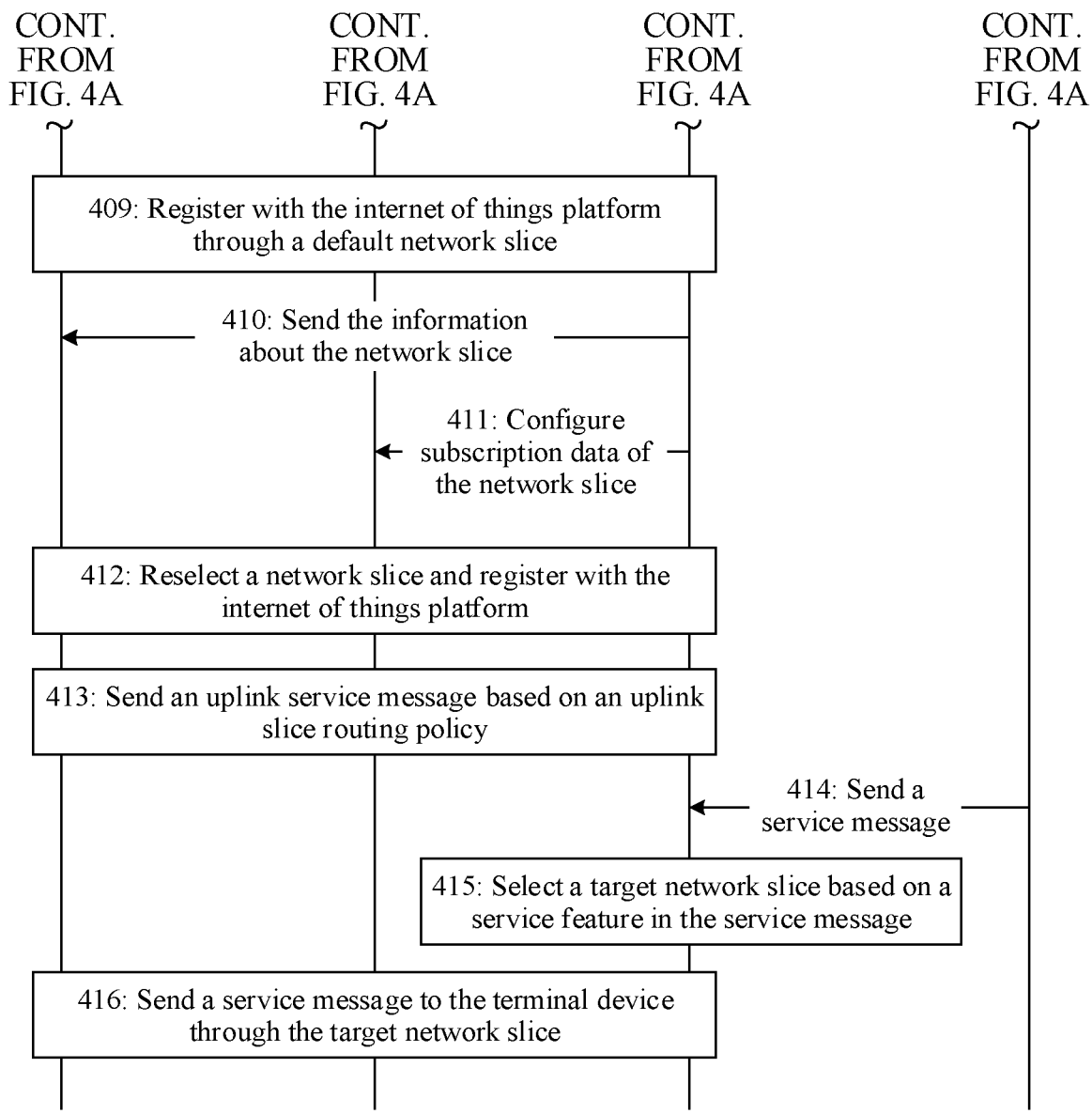

In a service scenario a, the general method procedure shown in FIG. 3 may be further supplemented and refined as a method procedure shown in FIG. 4A and FIG. 4B.

A step 401 is the same as the step 301a1, and details are not described again.

402: Optionally, the platform may query whether network slices that can meet the service level agreement in the step 1 exist in the underlying network. If network slices that can meet the service level agreement exist in the underlying network, the platform selects, from the network slices, one or more network slices that meet the condition to serve the industry application (and a terminal device related to the industry application), and skips steps 403 to 405. If network slices that can meet the service level agreement do not exist in the underlying network, for example, the service level agreement requires that transmission of a service flow needs to be isolated from another industry application, or parameters such as a latency/bandwidth do not meet a requirement, it means that a new network slice needs to be created to serve the service flow. Therefore, the steps 403 to 405 are performed.

403: The platform requests, from the underlying network (for example, an NSMF), to create a network slice that meets the service level agreement, and the request includes a description parameter corresponding to the service level agreement in the step 401. When the description parameter is different from a description parameter (slice template) that can be accepted by a network slice manager, the platform further needs to perform corresponding mapping or conversion, including but not limited to: parameter name mapping, unit conversion, parameter decomposition (for example, an end-to-end latency from the industry application to the terminal device minus a latency from the industry application to the platform, to obtain a latency of a network slice from the terminal device to the platform), and parameter filtering (for example, excluding a quantity/frequency of concurrent service messages irrelevant to a network).

404: The underlying network creates a corresponding network slice in the underlying network based on the request in the step 403.

405: Similar to the step 301a2, the platform obtains information about the created network slice from the underlying network.

406: Similar to the step 301a3, when the information about the network slice obtained in the step 405 is incomplete, the platform may further obtain supplementary information about the network slice from the underlying network.

407: The platform establishes a connection to the network slice.

408: The platform generates corresponding uplink and downlink service routing policies based on the information about the network slice obtained in the steps 405 to 407 and the service feature obtained in the step 401, as shown in Table 1 or Table 2.

409: Because the industry application has not configured the information about the network slice for the terminal device, the terminal device registers with the platform through a default network slice. This step may occur at any moment before the steps 401 to 408, in other words, this step does not depend on a result of interaction between the platform and the industry application and a result of interaction between the platform and the underlying network, and is independent of the steps 401 to 408 in a time sequence.

410: The platform configures an uplink service routing policy for the terminal device, where the configuration may be delivered in a plurality of manners, including through a service registration response message of the terminal device, through a device management command, through a dedicated service configuration message, through a network capability exposure API, through an eSIM process, and the like. Details are as follows:

When the service feature in the step 401 includes information (for example, a source/destination application identifier, a source/destination middleware identifier, and a resource identifier may respectively correspond to an application, middleware, and a resource on the terminal device, or the information directly includes an identifier of the terminal device) related to the terminal device, the platform may determine, based on this, terminal devices for which corresponding uplink service routing policies need to be configured, to perform the configuration operation in the step 410. In addition, the platform may further need to interact with the underlying network, and configure, for the terminal device, subscription data required for accessing a related network slice. As shown in a step 411, for example, the platform interacts with a user data management network element of the underlying network directly or through an NEF, to configure subscription data that allows the terminal device to access the network slice.

When the information provided by the industry application in the step 401 is insufficient to determine whether the terminal device is related to a specific network slice (for example, the service feature includes only a message priority and a type, but does not include information related to the terminal device), the platform may temporarily skip this step. However, after a step 414, the platform determines, based on a service feature of a downlink service message sent to the terminal device in the step 414, a network slice that the terminal device should access, to further perform the operation of configuring the uplink service routing policy for the terminal device in this step, and an operation of configuring, for the terminal device, subscription data required for accessing a related network slice in the step 411.

It should be noted that a message sent by the IoT platform in the step 410 may include only information about a network slice that the terminal device needs to access, and a service feature corresponding to the network slice may not be sent to the terminal device, or may be sent to the terminal device in another message. The message in the step 410 may be a configuration message or an independent trigger message. The platform may trigger, through the configuration message or the independent trigger message, the terminal device to perform a re-registration procedure in a step 412.

412: The terminal device accesses a network slice in the policy based on the uplink service routing policy configured in the step 410, and re-registers with the platform through the new network slice. If the network slice in the policy is exactly the default network slice used by the terminal device in the step 409, the terminal device does not need to perform this step. If the terminal device needs to access a plurality of network slices at the same time, the terminal device may re-register with the platform once through each network slice. Alternatively, the terminal device may further optimize one of the network slices to complete re-registration related to all the network slices at a time (the network slice carries necessary information of another network slice, for example, addressing information (for example, an identifier, an IP address, and a point of access (PoA)) of the terminal device in each network slice). For example, the terminal device performs registration through the default network slice in the step 409, and performs re-registration through the default network slice again in the step 412. A re-registration request includes the information about the terminal device in the another network slice. After the terminal device completes re-registration, the platform may obtain supplementary information (for example, an address of a UPF or an NEF currently serving the terminal device) of a slice network element from the registration message, and further add the information to the downlink service routing policy generated in the step 408.

413: After accessing the network slice, the terminal may subsequently select a corresponding network slice based on the uplink service routing policy configured in the step 410 and a service feature of an uplink service message, and send the uplink service message.

Steps 414 to 416 are the same as the steps 302 to 304, and are not described herein again.

The method provided may be developed and implemented in a plurality of manners.

The method procedure shown in FIG. 4A and FIG. 4B may be implemented by using a oneM2M standard as a framework. In terms of architecture, the IoT platform corresponds to an infrastructure node-common services entity (IN-CSE) defined in the oneM2M standard, and the industry application corresponds to an infrastructure node-application entity (IN-AE) defined in the oneM2M standard. Based on a service processing capability or configuration of the terminal device, different types of terminal devices may correspond to a middle node (MN), an application service node (ASN), or an application dedicated node (AND) defined in the oneM2M standard. For details about the foregoing concepts defined in the oneM2M standard, refer to a oneM2M standard specification "TS-0001_Functional_Architecture", and details are not described herein again.

According to a 3GPP 5G standard and a oneM2M standard framework, a possible implementation of the method procedure shown in FIG. 4A and FIG. 4B includes the following steps.

401: A message sent in this step may specifically be a registration message sent by the IN-AE to the IN-CSE, for example, a message for creating an <AE> resource. Alternatively, the message may be a separate configuration message, for example, a message for creating one or more service feature resources <trafficChar> and one or more associated service level agreement resources <SLA>, or creating one or more compound resources <trafficSLA> that include both a service feature and a service level agreement, or creating a service routing policy resource <nsRoutePolicy> (including an attribute or a child resource related to the service level agreement), or creating or updating an attribute or a child resource that is related to the service feature and the service level agreement and that is in a service subscription resource <serviceSubscriptionProfile>. The service feature includes one or more of a source/destination application identifier (for example, an APP-ID or an AE-ID), a source/destination middleware identifier (for example, a CSE-ID), a service resource identifier (for example, a Resource-ID), a service resource type (for example, a group, container, or mgmtObj type), a service message type (for example, a request req or a response resp) or an operation method (for example, creating C/obtaining R/updating U/deleting D/notifying N), a message priority (for example, a value of an Event Category parameter in an extended message, or a new Flow Type tag in a message), and the like. A manner of carrying the service feature and the service level agreement in the message may be a resource attribute or a child resource. If the message is sent as the registration message of the IN-AE, an <AE> resource in the oneM2M needs to be extended, and a composite attribute trafficSLA that includes both the service feature and the service level agreement is added as an attribute of the <AE>, or a compound resource <trafficSLA> is added as a child resource of the <AE>, or a service routing policy resource <nsRoutePolicy> is added as a child resource of the <AE>. Certainly, the extended attribute or child resource may further be used as an attribute or a child resource of another resource, and this does not affect an implementation effect of the solution. In any implementation, information received by the IN-CSE forms a data structure relationship as described in Table 3, where a cell with no specific value indicates that any value is matched or a default value is matched.

TABLE 3

Service feature and related service level agreement

| | | Service feature | | | | | Service level agreement | | | |
|---|---|---|---|---|---|---|---|---|---|---|
| # | Source | Destination | Resource type | Message type | Operation method | Message priority | Bandwidth bps | Latency ms | Reliability % | Isolation ... |
| 1 | | | | | R, D | 1 | 100k | 10 | 99.9 | Y |
| 2 | | Resource-id-x, Resource-id-y | | req, resp | C, U | 0 | 200k | 20 | 99.99 | N |
| 3 | | CSE-1 | <container> | | C, R, U, D | 2 | | 2 | 99.999 | Y |
| 4 | IN-AE 1; IN-AE 2 | | <flexContainer> | | | | 1M | | 99.9 | N |

In another implementation, the service level agreement may be further classified, to form several configurable types or levels (such as Profile, Category, and Level), as shown in Table 4:

TABLE 4

Classification of the service level agreement

| | Service level agreement | | | |
|---|---|---|---|---|
| Type # | Bandwidth bps | Latency ms | Reliability % | Isolation ... |
| Profile 1 | 100k | 10 | 99.9 | Y |
| Profile 2 | 200k | 20 | 99.99 | N |
| Profile 3 | | 2 | 99.999 | Y |
| Profile 4 | 1M | | 99.9 | N |

The information in Table 4 may exist as a separate resource or attribute, or exist as a part of another resource (for example, a root resource <CSEBase>, a service subscription resource <serviceSubscriptionProfile>, or a service level agreement resource <SLA>), and may be preconfigured on the IN-CSE. Alternatively, the information may be created or updated by one or more IN-AEs.

Table 4 and Table 3 may be simplified into Table 5, and a same type of service level agreement may be reused by different service flows. Correspondingly, in a message sent by the IN-AE, a manner of describing the service level agreement may be simplified, and a defined service level agreement classification identifier or type (for example, Profile 1) is directly referenced.

TABLE 5

Service feature and related service level agreement

| | Information about the service feature | | | | | Type of the service level agreement |
|---|---|---|---|---|---|---|
| Source | Destination | Resource type | Message type | Operation method | Message priority | |
| | | | | R, D | 1 | Profile 1 |
| | Resource-id-x, Resource-id-y | | req, resp | C, U | 0 | Profile 2 |
| | CSE-1 | <container> | | C, R, U, D | 2 | Profile 3 |
| IN-AE 1; IN-AE 2 | | <flexContainer> | | | | Profile 1 |

402: The IN-CSE determines, based on the isolation in the service level agreement obtained in the step 401, that some service flows of the industry application do not need to be isolated, and queries whether network slices that can meet service level agreement corresponding to these service flows exist in existing network slices in a 3GPP network. If the network slices that can meet service level agreement corresponding to these service flows exist in the existing network slices in the 3GPP network, the IN-CSE selects one or more network slices that meet a condition from the network slices to serve the service flows (and a terminal device related to the service flows). If the network slices that can meet service level agreement corresponding to these service flows do not exist in the existing network slices in the 3GPP network, for example, isolation is required in the service level agreement, or parameters such as a latency/bandwidth of the existing network slices cannot meet the requirement, steps 403 to 405 are performed.

403: The IN-CSE requests the network slice manager NSMF to create a network slice that meets the service level agreement, and maps or converts, if necessary, a description parameter of the service level agreement in the request, for example, parameter name mapping (for example, latency is converted into delay), unit conversion (for example, ms is converted into s), parameter decomposition (for example, an end-to-end latency from the IN-AE to the terminal device minus a latency from the IN-AE to the IN-CSE, to obtain a latency of network slice), and parameter filtering (for example, excluding a quantity/frequency of concurrent service messages irrelevant to a network)

404: The NSMF creates a corresponding network slice in the underlying network based on the request in the step 403.

405: The IN-CSE obtains information about the created network slice from the NSMF.

The information about the network slice includes one or more of a slice identifier/name (for example, an NS-NSSAI or an NS-ID), a slice type (for example, eMBB, uRLLC, or mMTC), an operator identifier/name (for example, CMCC or VDF), a slice network element address (for example, IP addresses of a UPF and a NEF, and a VLAN identifier or a tunnel identifier for establishing a link layer connection between the IN-CSE and the UPF/NEF), and the like.

406: When the information, obtained in the step 405, about the network slice is incomplete (for example, a necessary slice network element address is not obtained), the IN-CSE may request, from a network slice management function NSMF in the 3GPP network, to obtain supplementary information (including, for example, addresses of the UPF and the NEF in the slice, or further including transport layer information and other information (for example, a slice type)) of a related network element in the network slice. A request message sent by the IN-CSE to the NSMF carries a slice identifier eMBB-A, and the IN-CSE obtains a required slice network element address UPF3:{IP5};{VLAN5}, NEF3:{IP6};{VLAN6}, a slice type eMBB, and the like from a response.

When a plurality of network elements (for example, a plurality of UPFs or a plurality of NEFs) with a same function exist in one network slice, the IN-CSE may further need to query, from the NSMF (based on a related identifier of a terminal device, for example, an IMSI, an IMEI, or an External-ID), information about a specific home (or serving) network element of a specific terminal, and distinguishes records (resource identifiers, application identifiers, middleware identifiers, and the like of different terminal devices are divided into a plurality of records that respectively correspond to different slice network element addresses and transport layer information). Alternatively, after the terminal device and the IN-CSE subsequently complete registration or other service message interaction, the IN-CSE determines, based on a specific network element from which a service message of the terminal device is received, information about a home (or serving) network element of the terminal device.

Further, the IN-CSE may further need to query information about another network element in a same slice based on some slice network element information. For example, if only a UPF address in a slice is obtained in the step 405, but a NEF address is missing, the IN-CSE needs to query an associated NEF address in the same slice based on the UPF address, and vice versa.

407: The IN-CSE checks whether it has established a connection to the network slice, and if not, establishes a connection to each related network slice based on the information (specifically, each slice network element address and the transport layer information), obtained in the foregoing step, about the network slice. For example, the IN-CSE needs to establish a link layer connection and an IP layer connection to each of a UPF 1, a UPF 2, a UPF 3, a NEF 1, a NEF 2, and a NEF 3.

408. The IN-CSE generates corresponding uplink and downlink service routing policies based on the information, obtained in the steps 405 and 406, about the network slice and the service feature obtained in the step 401. For specific content and forms of the uplink and downlink service routing policies, refer to Table 6 and Table 7. According to different specific implementations, Table 3, Table 4, and Table 5 may be combined with Table 6 or Table 7. Each record in Table 6 may have one or more vacant cells. A cell with no content indicates that any value is matched, or a default value is matched. A plurality of pieces of information may be filled in each cell of each record. For example, a plurality of CSE-IDs, AE-IDs, and Resource-IDs may be filled in cells for "source" and "destination", and a plurality of resource types such as <container> and <group> may be filled in a cell for "resource type". To distinguish between service flows allowed to pass or forbidden to pass by each network slice, an attribute or a child resource similar to that in Table 6 may be separately established (using a different name or type, for example, an nsRoutePolicyBlocked attribute or a <nsRoutePolicyBlocked> resource), to describe a service feature of a forbidden-to-pass service flow. In this case, Table 6 is used to describe a service feature of an allowed-to-pass service flow. Alternatively, an additional association label is added to a related cell in Table 6 for distinguishing. For example, a ";f" association label added after an application identifier "IN-AE 1" in the "source" of the fourth record indicates that an IN-AE 1 is forbidden from being used as an initiator to send a service message to the terminal device through an mMTC-C slice. Alternatively, a forbidden or allowed flag attribute (for example, blocked=true, allowed=false, or purpose=block) is added to an entire <nsRoutePolicy> resource for distinguishing.

about the slice-related service feature. A difference lies in that the information about the network slice in Table 7 is relatively simple, and slice network element address information may not be required. When the uplink service routing policy needs to be configured for a plurality of terminal devices, the IN-CSE may create a corresponding service routing policy attribute or service routing policy resource for each terminal device, or create a shared attribute or resource for each terminal device. A sharing mode may be implemented through an association link pointing to a same service routing policy attribute or resource.

To distinguish from a downlink service routing policy attribute or resource, an attribute or a resource with a different name or type may be designed for the uplink service routing policy, for example, an nsRoutePolicyUplink attribute or a <nsRoutePolicyUplink> resource. Alternatively, because data structures of the uplink and downlink service routing policies are basically the same, the uplink and downlink service routing policies may share a same nsRoutePolicy attribute or a same <nsRoutePolicy> resource type, but are distinguished by adding an uplink and downlink flag attribute (for example, direction=uplink or

TABLE 6

Service routing policy attribute or child resource data structure (downlink)

| | Information about the network slice | | | | Information about a slice-related service feature | | | | |
|---|---|---|---|---|---|---|---|---|---|
| # | Operator identifier | Slice identifier | Slice type | Network element address | Source | Destination | Resource type | Message type | Operation method | Message priority |
| 1 | CMCC | eMBB-A | | | | | | | R, D | 1 |
| 2 | | uRLLC-B | | UPF1: {IP1}; {Tunnel-1} NEF1: {IP2}; {VLAN2} | | Resource-id-x, Resource-id-y | | req, resp | C, U | 0 |
| 3 | VDF | | mMTC | | | CSE-1 | <container> | | C, R, U, D | 2 |
| 4 | VDF | mMTC-C | | UPF2: {IP3}; {Tunnel-3} NEF2: {IP4}; {VLAN4} | IN-AE1; f IN-AE2 | | <flexContainer> | | | |

The uplink service routing policy is shown in Table 7, and is used by the terminal device to select a service route for an uplink service flow sent to the IN-CSE. Table 7 also includes the information about the network slice and the information downlink). Similarly, in the uplink service routing policy, different names or types or associated labels, flag attributes, and the like may be used to distinguish allowed-to-pass or forbidden-to-pass service flows.

TABLE 7

Service routing policy attribute or child resource data structure (uplink)

| | Information about the network slice | | | | | | |
|---|---|---|---|---|---|---|---|
| | | | | Information about the slice-related service feature | | | |
| # | Slice identifier | Source | Destination | Resource type | Message type | Operation method | Message priority |
| 1 | eMBB-A | | | | | R, D | 1 |
| 2 | uRLLC-B | | Resource-id-n, Resource-id-m | | req, resp | C, U | 0 |
| 3 | | | CSE-z | <container> | | C, R, U, D | 2 |

TABLE 7-continued

Service routing policy attribute or child resource data structure (uplink)

| | Information about the network slice | Information about the slice-related service feature | | | | | |
|---|---|---|---|---|---|---|---|
| # | Slice identifier | Source | Destination | Resource type | Message type | Operation method | Message priority |
| 4 | mMTC-C | ADN-AE1; f ADN-AE2 | | <flexContainer> | | | 3 |

409: An AE or a CSE on the terminal device registers with the IN-CSE through a default network slice.

410: If the IN-CSE determines that the terminal device is registered for the first time (or determines that a registration message of the terminal device is from a network slice different from the service routing policies generated in the step 408), the IN-CSE configures the uplink service routing policy generated in the step 408 for the terminal device. The configuration may be delivered in a plurality of manners. For example, when the AE or the CSE on the terminal device initiates a registration procedure to the IN-CSE, the configuration is delivered in a registration response message (message body content is extended). Alternatively, the configuration may be delivered through an independent device management command, and in this case, the uplink service routing policy needs to be designed as a specific structure of a device management resource <mgmtObj>. In the specific structure, there is the related information in Table 7, and an mgmtDefinition attribute value of the resource <mgmtObj> needs to be set to a value that can indicate the uplink service routing policy, for example, nsRoutePolicyUplink. Similarly, the configuration may alternatively be delivered through another service configuration message (for example, creation an uplink service routing policy resource <nsRoutePolicyUplink> on the ASN-CSE) or in an eSIM remote provisioning process. Further, the IN-CSE may trigger, through the configuration message or an independent trigger message, the AE or the CSE on the terminal device to perform a service re-registration procedure described in a step 412. For example, if the configuration message is a registration response message, the registration response message may carry a re-registration indication parameter (for example, a special Hypertext Transfer Protocol (HTTP) 300 series redirection response code, an extended message header, or message body content). If the configuration message is a device management command, the command needs to access a specific <mgmtObj> resource (which may be an extension of an existing <mgmtObj> resource, or a specific type of a new <mgmtObj> resource), where the configuration message includes a re-registration indication attribute re-registration, or further includes information about a related network slice (for example, a network slice identifier, or a link pointing to the service routing policy resource or attribute that includes network slice information). In addition, the IN-CSE may request, from an underlying 3GPP network, to configure related network slice subscription data for the terminal device, which may be specifically implemented by directly interacting with a UDM/UDR or interacting with a UDM/UDR through an NEF API, as shown in the step 411.

412: The terminal device selects, based on the uplink service routing policy configured in the step 410, to access a network slice in the policy, and the AE or the CSE on the terminal device re-registers with the IN-CSE based on a condition in the uplink service routing policy through a new network slice. A registration message needs to carry necessary information about the new network slice (for example, an identifier of the new network slice, addressing information (for example, an identifier, an IP address, and a point of access (PoA)) of the AE or the CSE on the terminal device in the new network slice, and/or an address of a network element in the new slice). For example, if different AEs on the terminal device respectively belong to sources or destinations of different service flows, the AEs need to respectively register with the IN-CSE through different network slices. Alternatively, when a CSE is deployed on the terminal device, the AE registers with only a local CSE, and the CSE (representing one or more AEs) registers with the IN-CSE for a plurality of times through a plurality of network slices.

Further, the AE or the CSE on the terminal device may select one of the plurality of network slices to register with the IN-CSE. However, the registration message needs to carry necessary information about all related network slices (for example, identifiers of the network slices, addressing information (for example, an identifier, an IP address, and a PoA) of the AE or the CSE on the terminal device in each network slice, and/or a slice network element address). Therefore, the terminal device may further need to further interact with a network to obtain the addressing information of the terminal device or the slice network element address information. For example, when the terminal device is located under a firewall/gateway, the terminal device needs to obtain a public network address of the terminal device through a method, for example, STUN, and ensure that the firewall or gateway can ensure that the public address of the terminal device can be accessed by a communication peer (IN-CSE) that is not connected.

If the network slice in the policy is exactly the default network slice used by the terminal device in the step 409, the terminal device does not need to perform this step. After the terminal device completes re-registration, the platform may obtain supplementary information (for example, an address of a UPF or an NEF currently serving the terminal device) of a slice network element from the registration message, to further update the downlink service routing policy generated in the step 408.

413: When sending an uplink service message, the terminal device determines, based on the uplink service routing policy shown in Table 7, a network slice corresponding to a service feature (for example, one or more of a source, a destination, a resource type, a message type, an operation method, and a message priority) of the service message, and sends the uplink service message through the network slice.

414: The IN-CSE receives a downlink service message from an IN-AE (whose application identifier is IN-AE 2). For example, the message is used to read a value of a temperature sensor on the terminal device.

415: The IN-CSE extracts a service feature of the downlink service message. The service feature includes a destination address that is a <flexContainer> type resource on the terminal device, and an operation method that is reading (R), and does not carry a specific message priority indication. The IN-CE queries the downlink service routing policy shown in Table 3, and prepares, based on the fourth record in the downlink service routing policy, to send the downlink service message to the terminal device through an mMTC-C network slice of VDF.

416: If the IN-CSE determines that the downlink service message is a common user plane message, the IN-CSE sends the downlink service message to the terminal device through a UPF 2 network element of the mMTC-C slice. Therefore, the IN-CSE forwards the message to an address of a UPF 2. In another possible embodiment, if the IN-CSE determines that the downlink message needs to invoke an API of the NEF (for example, the IN-CSE needs to learn of a hibernation status of the terminal device through the API of the NEF, or sends an MBMS multicast message through the NEF), the IN-CSE needs to forward the downlink message to the NEF 2, or invoke, according to a requirement of a service procedure, a related API capability of the NEF 2 before forwarding the downlink message to the UPF 2.

The foregoing describes, in the service scenario a, the method and the possible implementations provided. In the service scenario b, namely a mode in which the industry application directly signs a contract with the operator of the underlying network to purchase a network slice service, the method shown in FIG. 3 may be further supplemented and refined as a method procedure shown in FIG. 5. A difference between the method procedure shown in FIG. 5 and the method procedure shown in FIG. 4A and FIG. 4B lies in how the IoT platform obtains the service feature and the information about the corresponding network slice. In the method procedure shown in FIG. 5, because an industry application has directly signed a contract with a network operator to purchase a network slice service, in this scenario, information about a network slice and information about a service feature related to the slice have been preconfigured on the industry application (see a step 501), and the platform only needs to obtain the information from the industry application (see a step 502), to establish (and store) a service routing policy. Steps 503 to 513 in FIG. 5 are the same as the steps 406 to 416 in FIG. 4A and FIG. 4B, and details are not described herein again.

Figure 5:
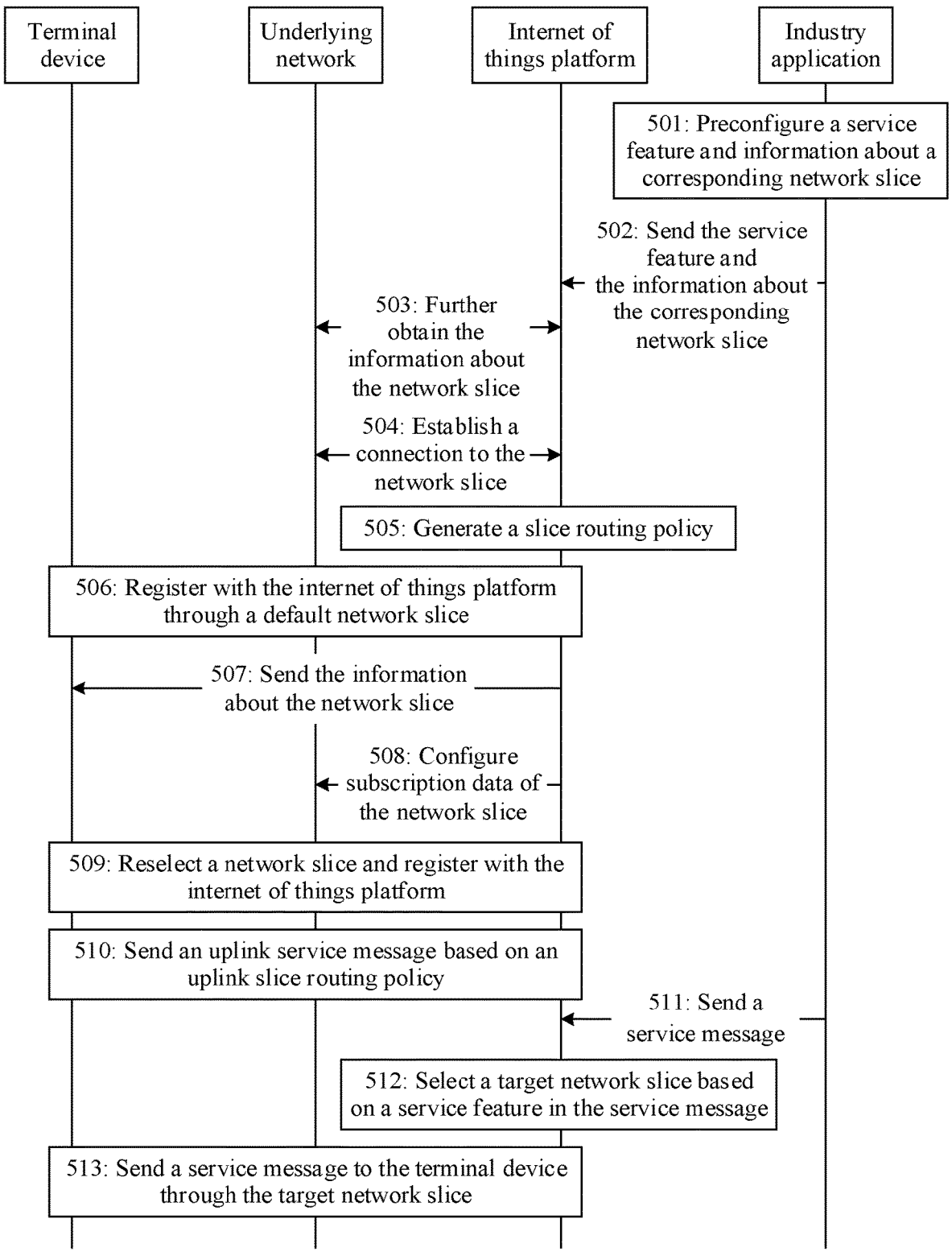
FIG. 5 is a flowchart of an IoT service routing method in a scenario in which an IoT platform obtains network slice information from an industry application according to an embodiment.

Similarly, the method procedure shown in FIG. 5 may also be implemented in a plurality of manners or through a protocol architecture. Using a oneM2M standard protocol framework as an example, a possible specific implementation of the method procedure shown in FIG. 5 is as follows:

501: An IN-AE preconfigures the information about the network slice and the information about the slice-related service feature. The information about the network slice includes one or more of a slice identifier/name (for example, an S-NSSAI or an NS-ID), a slice type (for example, eMBB, uRLLC, or mMTC), an operator identifier/name (for example, CMCC or VDF), a slice network element address (for example, IP addresses of a UPF and a NEF, and a VLAN identifier or a tunnel identifier for establishing a transport layer connection between an IN-CSE and the UPF/NEF), and the like. The information about the slice-related service feature includes one or more of a source/destination application identifier (for example, an APP-ID or an AE-ID), a source/destination middleware identifier (for example, a CSE-ID), a service resource identifier (for example, a Resource-ID), a service resource type (for example, a group, container, or mgmtObj type), a service message type (for example, a request req or a response resp) or an operation method (for example, creating C/obtaining R/updating U/deleting D/notifying N), a message priority (for example, a value of an Event Category parameter in an extended message, or a new Flow Type tag in a message), and the like. This step further includes: for each network slice, classifying the service feature into two types: allowed to pass and forbidden to pass.

502: The IN-AE sends, to the IN-CSE, a message for configuring a service routing policy. The message may be a registration message sent by the IN-AE to the IN-CSE, for example, a message for creating an <AE> resource. Alternatively, the message may be a separate configuration message, for example, a message for creating an independent service routing policy resource <nsRoutePolicy>, or a message for creating or updating a service subscription resource <serviceSubscriptionProfile>. The foregoing message carries the preconfigured information about the network slice and the information about the slice-related service feature in the step 1 in a form of a resource attribute or a child resource. If the message is sent as the registration message of the IN-AE, an <AE> resource in the oneM2M needs to be extended, and a service routing policy attribute nsRoutePolicy is added as an attribute of the <AE>, or a service routing policy resource <nsRoutePolicy> is added as a child resource of the IN-AE, and includes one or more records of the data structure shown in Table 6. The message sent by the IN-AE in this step may carry the downlink service routing policy that is shown in Table 6, that is configured for the IN-CSE, and that is used by the IN-CSE to select a service route for a downlink service flow sent to the terminal device, and may further carry the uplink service routing policy that is shown in Table 7, that is configured for one or more terminal devices, and that is used by the terminal device to select a service route for an uplink service flow sent to the IN-CSE.

The steps 503 to 513 may use a specific implementation that is the same as the method procedure shown in FIG. 4A and FIG. 4B, and details are not described herein again.

Figure 6:
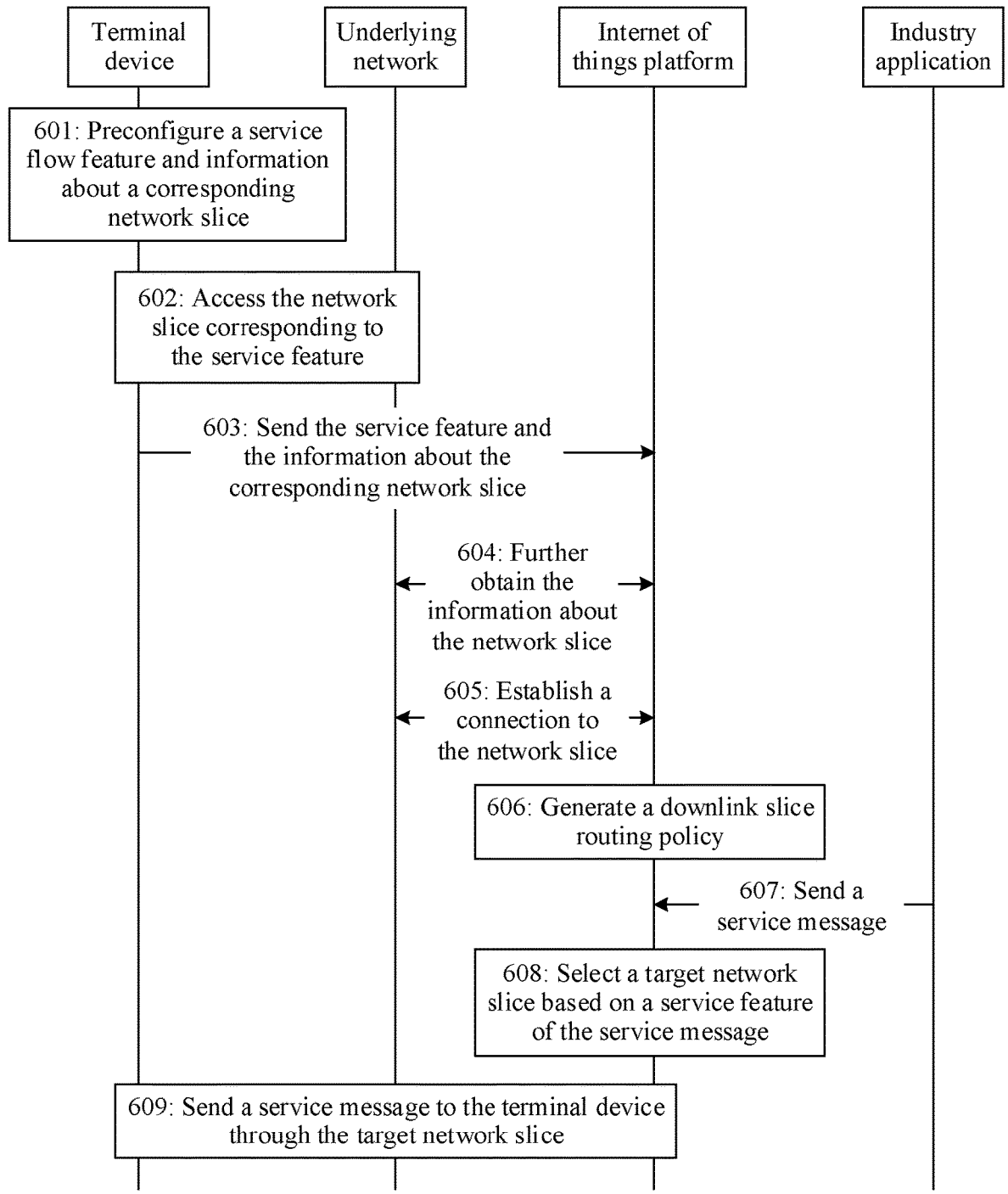
FIG. 6 is a flowchart of an IoT service routing method in a scenario in which an IoT platform obtains network slice information from a terminal device according to an embodiment.

As described above, in addition to the service scenario a and the service scenario b, there is a possible service scenario c. In the service scenario c, the platform may obtain the information about the network slice and the information about the corresponding service feature from the terminal device. The method procedure shown in FIG. 3 may be further supplemented and refined as a method procedure shown in FIG. 6.

601: A terminal device preconfigures information about a network slice and a slice-related service feature. The information about the network slice and the service feature are similar to those described in the service scenarios a and b. A difference lies in that each terminal device configures only the foregoing information related to the terminal device, and the industry application and the underlying network in the service scenarios a and b configure the foregoing information of all terminal devices related to the industry application for the platform. When the method is implemented through a oneM2M standard framework, the information about the network slice and the slice-related service feature may be preconfigured on an AE or a CSE on the terminal device.

602: The terminal device accesses, according to a 3GPP standard procedure, a network slice corresponding to the service feature, establishes a data channel to a network, and obtains an IP address.

603: The terminal device initiates, to the platform through the network slice accessed in the step 602, a procedure of configuring a service routing policy, and sends the information about the network slice and the slice-related service feature to the platform. The procedure may be a part of a procedure in which the terminal device registers with the platform (in other words, implemented through a registration request message sent by the terminal device to the platform), or may be an independent procedure (for example, implemented through an independent configuration message). When the terminal device simultaneously accesses a plurality of network slices, the terminal device may send the information to the platform through one of the network slices, or may separately send, through each network slice, the information related to the network slice. When the method is implemented through the oneM2M standard framework, the message may be a registration message sent by the AE or the CSE on the terminal device to the IN-CSE, for example, a message for creating an <AE> resource. Alternatively, the message may be a separate configuration message, for example, a message for creating an independent service routing policy resource <nsRoutePolicy>, or a message for creating or updating a service subscription resource <serviceSubscriptionProfile>. It should be noted that the message in the step 603 may carry only a downlink service routing policy related to the terminal device.

Steps 604 to 606 are similar to the steps 406 to 408 in FIG. 4A or the steps 503 to 505 in FIG. 5, and a difference lies in that the platform does not need to generate an uplink service routing policy.

Steps 607 to 609 are the same as the steps 414 to 416 in FIG. 4B or the steps 511 to 513 in FIG. 5.

Figure 7:
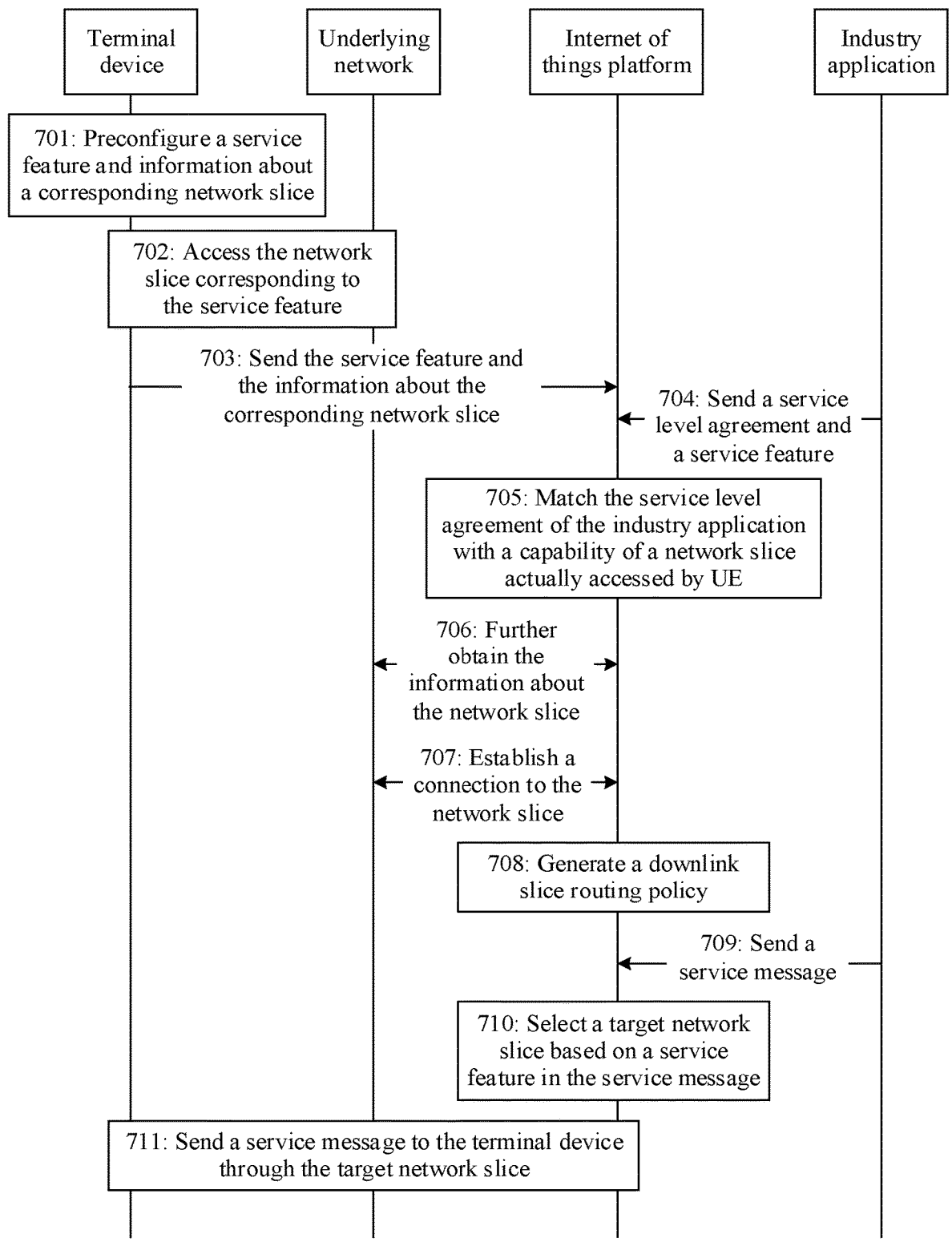
FIG. 7 is a schematic flowchart of another IoT service routing method according to an embodiment.

It should be noted that an actual service scenario may be more complex than the foregoing service scenarios a, b, and c. Therefore, the method procedures in the foregoing service scenarios may need to be integrated to adapt to a more complex service scenario. For example, there is a service scenario in which different users respectively have operation rights or property rights of the industry application and the terminal device. For example, a sensor on a smart lamp pole may belong to a government department, but sensor data (for example, atmospheric pollution) may be used by an environmental industry application, in other words, the environmental industry application and the sensor on the smart lamp pole belong to different users. In this case, the uplink/downlink service routing policy of the terminal device is completely determined by the configuration of the terminal device, and the industry application may have no right to configure the uplink/downlink service routing policy for the terminal device through the platform. In this case, the platform may need to match, by referring to the method procedures shown in FIG. 4A, FIG. 4B and FIG. 6, a service level agreement of the industry application with a service level service capability that can be provided by a network slice actually accessed by the terminal device, as shown in FIG. 7.

Steps 701 to 703: Referring to the steps 601 to 603 shown in FIG. 6, a terminal device accesses a corresponding network slice based on preconfigured information about a network slice and a slice-related service feature, and further configures a related downlink service routing policy on a platform.

704: Referring to the step 401 in FIG. 4A, an industry application sends, to the platform, a service feature and an SLA related to information about the service feature.

705: The platform checks whether the network slice accessed by the terminal device in the steps 701 to 703 can match (or meet) the service level agreement (for example, bandwidth, a latency, and reliability) in the step 704. It should be noted that the platform may obtain a performance parameter (for example, performance such as bandwidth, a latency, and reliability) of the network slice by means of query or local storage. For example, in the step 701, if the downlink service routing policy configured by the terminal device requires that all downlink messages must use eMBB, and the slice cannot meet a downlink message latency requirement of the industry application, it is considered that the network slice does not match the service level agreement. If the network slice matches the service level agreement, the process goes to subsequent steps. If the network slice does not match the service level agreement, an error response message is sent to the industry application, and the subsequent steps are stopped. If the network slice partially matches the service level agreement, processing is performed as that when the network slice does not match the service level agreement (an error response is sent to the industry application and the subsequent steps are stopped); or the subsequent steps are performed only for a matched part, and an unmatched part is ignored; or a network slice with a closest service level agreement is further selected for the unmatched part or a network slice matching the service level agreement is created, and then the subsequent steps are performed. When the platform creates a new network slice to meet the service level agreement of the industry application, the platform further needs to notify the terminal device to access the new network slice, as described in the steps 409 to 412.

Steps 706 to 711 are the same as those in the foregoing embodiments, and details are not described again.

It can be learned from the foregoing specific implementations that when an IoT industry application and a terminal device need to use a plurality of network slices, in the technical solution provided, a service routing policy is established on a platform and a terminal, so that the platform and the terminal can correctly and effectively perform service routing on uplink and downlink service messages. This resolves a problem that the platform or the terminal cannot select a correct slice for service flows with different characteristics to perform message forwarding and filtering, and simplifies network slice management for an industry user.

Functions of the terminal device, the industry application, or the IoT platform may be implemented by an independent apparatus or server. The industry application or the IoT platform may alternatively be a service logic function or a computer program that is deployed or run on a cloud or another general-purpose server. For example, the functions of the terminal device, the industry application, or the IoT platform may be implemented through an apparatus shown in FIG. 8. The apparatus 800 shown in FIG. 8 includes at least one processor 801, a communications line 802, a memory 803, and at least one communications interface 804. The apparatus 800 may be a terminal device, an IoT platform, or an industry application apparatus, or may be a chip in a terminal device, an IoT platform, or an industry application apparatus. This is not specifically limited in this embodiment. When the apparatus 800 is a chip, optionally, a function/an implementation process of the communications interface 804 may be implemented through a pin, a circuit, or the like. Optionally, the memory is a storage unit in the chip, for example, a register or a cache. The storage unit may alternatively be in the terminal and located outside the chip.

The processor 801 may be a general-purpose central processing unit (CPU), a microprocessor, an application-specific integrated circuit (ASIC), or one or more integrated circuits configured to control program execution of the solution.

The communications line 802 may include one or more channels for transmitting information between the foregoing components.

The communications interface 804 is any type of apparatus implementing signal receiving and sending, and is configured to communicate with another device, apparatus or communications network, for example, an Ethernet, a radio access network (RAN), or a wireless local area network (WLAN).

The memory 803 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc ROM (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 803 is not limited thereto. The memory may exist independently, and is connected to the processor through a bus. The memory may alternatively be integrated with the processor.

The memory 803 is configured to store application program code for executing the solution, and the processor 801 controls execution of the application program code. The processor 801 is configured to execute the application program code stored in the memory 803, to implement the functions of the terminal device, the industry application, or the IoT platform in the method in this patent.

Figure 8:
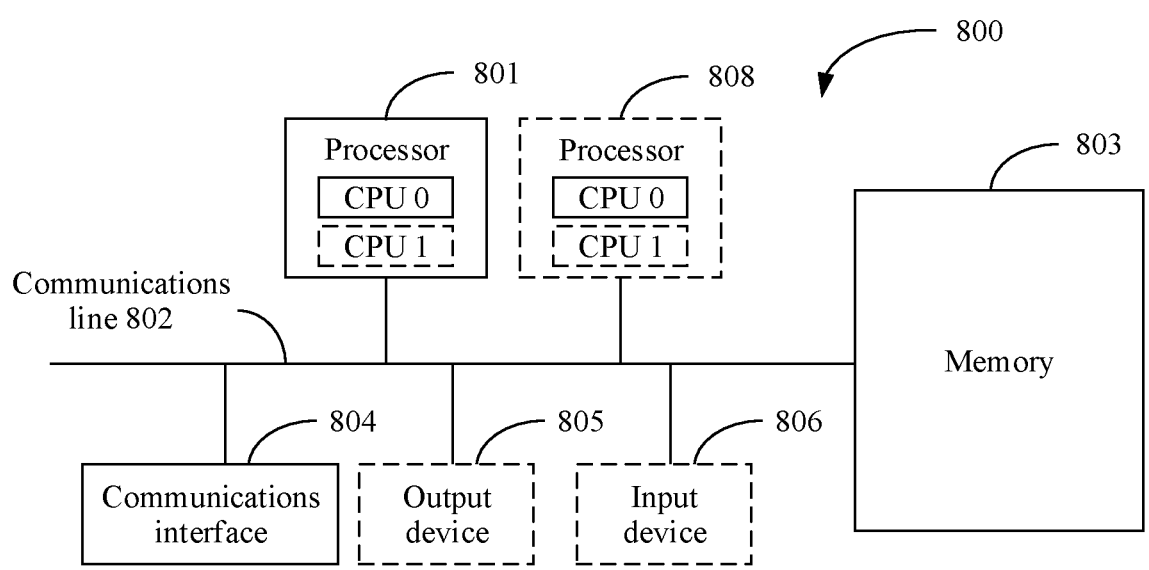
FIG. 8 is a schematic diagram of an apparatus according to an embodiment.

During a specific implementation, in an embodiment, the processor 801 may include one or more CPUs, for example, a CPU 0 and a CPU 1 in FIG. 8.

During a specific implementation, in an embodiment, the apparatus 800 may include a plurality of processors, for example, the processor 801 and a processor 808 in FIG. 8. Each of the processors may be a single-core (single-CPU) processor, or may be a multi-core (multi-CPU) processor. The processor herein may be one or more devices, circuits, and/or processing cores for processing data (for example, a computer program instruction).

During a specific implementation, in an embodiment, the apparatus 800 may further include an output device 805 and an input device 806. The output device 805 communicates with the processor 801, and may display information in a plurality of manners. For example, the output device 805 may be a liquid-crystal display (LCD), a light-emitting diode (LED) display device, a cathode-ray tube (CRT) display device, a projector, or the like. The input device 806 communicates with the processor 801, and may receive user input in a plurality of manners. For example, the input device 806 may be a mouse, a keyboard, a touchscreen device, or a sensing device.

The apparatus 800 may be a general-purpose apparatus or a dedicated apparatus. During a specific implementation, the apparatus 800 may be a desktop computer, a portable computer, a dedicated server, a communications device, an embedded device, or a device having a structure similar to that in FIG. 8. A type of the apparatus 800 is not limited.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

A person skilled in the art should understand that the foregoing descriptions are merely specific embodiments of the technical solution provided, but are not intended to limit the protection scope of the present disclosure. Any modification, equivalent replacement, or improvement made based on the technical solution shall fall within the protection scope of the present disclosure. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

What is claimed is:

1. A method implemented by an Internet of things (IoT) platform and comprising:
   receiving a service message from an application;
   determining, based on a first service feature of the service message, a target network slice corresponding to the first service feature, including:
   obtaining, from the application, the first service feature and a service requirement corresponding to the first service feature;
   obtaining, from an underlying network, first information about a target network slice corresponding to the first service feature;
   determining that no network slice that meets the service requirement exists in the underlying network; and
   requesting, the underlying network to create the target network slice; and
   sending, the service message to a terminal device through the target network slice.

2. The method of claim 1, wherein the service requirement comprises a first description parameter of the service requirement, and wherein the method further comprises:
obtaining a second description parameter of the target network slice by converting or mapping the first description parameter; and
sending a message comprising the second description parameter and requesting the underlying network to create the target network slice.

3. The method of claim 1, wherein after obtaining the first service feature and the first information, the method further comprises:
determining, based on the first service feature and the first information, a second service feature of an uplink service message from the terminal device and corresponding to the first service feature and second information about the target network slice corresponding to the second service feature; and
sending, to the terminal device, the second service feature of the uplink service message and the second information.

4. The method of claim 1, wherein after obtaining the first service feature and the first information, the method further comprises sending the first information to the terminal device.

5. The method of claim 1, further comprising:
receiving, from the terminal device, a registration request comprising addressing information of the terminal device in the target network slice; and
determining the addressing information; and
further sending the service message based on the addressing information.

6. The method of claim 5, wherein receiving the registration request comprises:
receiving a first registration request from the terminal device through a first network slice that is different from the target network slice;
instructing the terminal device to access the target network slice; and
receiving a second registration request from the terminal device through the target network slice, wherein the second registration request comprises the addressing information.

7. The method of claim 5, wherein receiving the registration request comprises:
receiving a first registration request from the terminal device through a first network slice in the target network slice;
instructing the terminal device to access the target network slice, wherein the target network slice comprises another network slice other than the first network slice; and
receiving a second registration request from the terminal device through any network slice in the target network slice,
wherein the second registration request comprises the addressing information.

8. The method of claim 6, further comprising sending, to the terminal device, the first service feature and information about the target network slice corresponding to the first service feature to instruct the terminal device to access the target network slice and register with the IoT platform through the target network slice.

9. The method of claim 1, wherein the first information comprises one of an identifier or a name of the target network slice, a type of the target network slice, an identifier or a name of an operator to which the target network slice belongs, or an address of a network element in the target network slice.

10. The method of claim 1, wherein the first service feature comprises at least any one of a source application identifier or type, a destination application identifier or type, a source service middleware identifier or type, a destination service middleware identifier or type, a service resource identifier or type, a service message type, an operation method, or a message priority.

11. A method implemented by a terminal device and comprising:
registering with an internet of things (IoT) platform through a first network slice;
receiving a message from the TOT platform through the first network slice, wherein the message comprises a service feature and information about a target network slice corresponding to the service feature;
registering, with the IoT platform through the target network slice; and
sending an uplink service message to the IoT platform through the target network slice or receiving a downlink service message from the IoT platform through the target network slice,
wherein the uplink service message and the downlink service message meet the service feature.

12. The method of claim 11, further comprising sending a registration request for registering with the IoT platform through the target network slice, wherein the registration request comprises addressing information of the terminal device in the target network slice.

* * * * *